G. W. RODEBAUGH.
Saw-Mill Dogs.
No. 196,102. Patented Oct. 16, 1877.
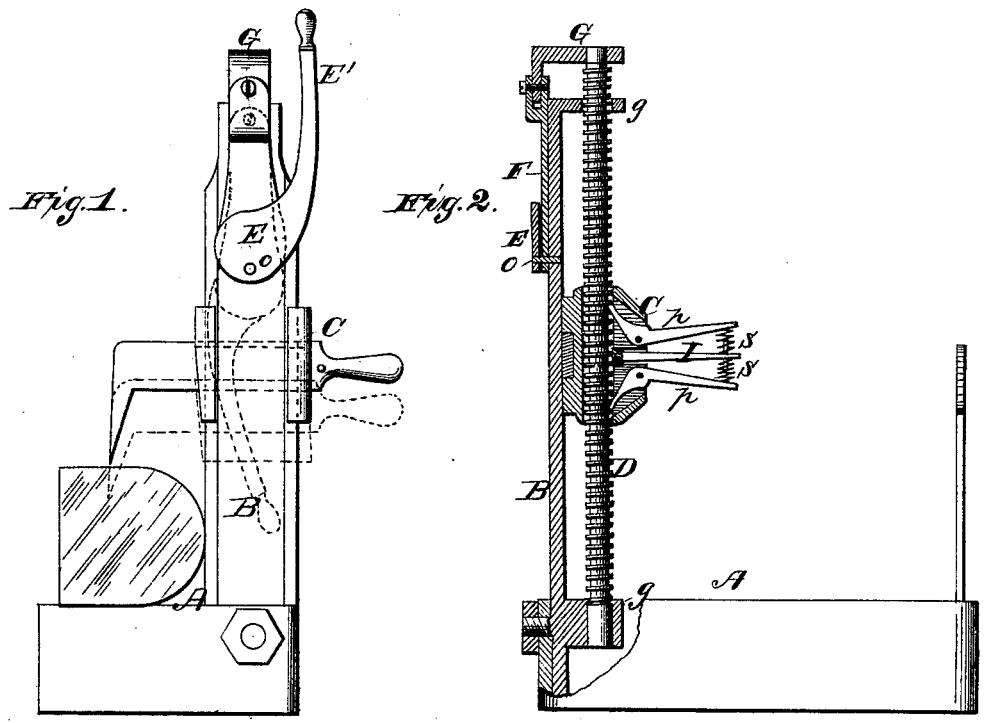
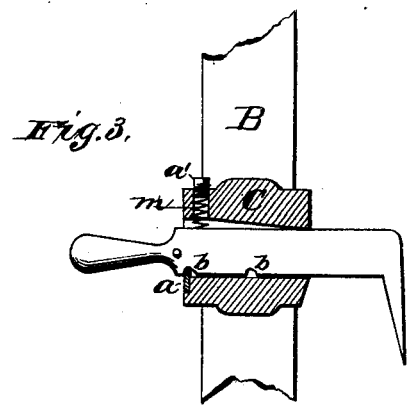
Witnesses:
Franck L. Durand
M. Church
Inventor:
George W. Rodebaugh
By Hill Ellsworth
His Atty

UNITED STATES PATENT OFFICE.

GEORGE W. RODEBAUGH, OF JACKSON, MICHIGAN.

IMPROVEMENT IN SAW-MILL DOGS.

Specification forming part of Letters Patent No. 196,102, dated October 16, 1877; application filed August 27, 1877.

*To all whom it may concern:*

Be it known that I, GEORGE W. RODEBAUGH, of Jackson, in the county of Jackson and State of Michigan, have invented certain new and useful Improvements in Saw-Mill Dogs; and I do hereby declare the following to be a full and exact description of the same, reference being had to the accompanying drawing, forming part of this specification, in which—

Figure 1 represents an end elevation of the invention, showing the eccentric-lever raised and the bit of the dog retracted from the log, and also, in dotted lines, the position of the parts when the bit of the dog is embedded in the log and the device locked. Fig. 2 represents a vertical section taken through the guiding-standard, the adjustable dog head or stock, and the eccentric-lever and connecting-bar, showing also the arrangement of the guides for the carrying-bar and the spring-pawls for connecting the dog-head or stock with the carrying-bar; and Fig. 3 is a transverse sectional view of the dog-head, showing the tapered mortise, the notches in the shank of the dog, and the tooth or projection for engagement therewith, together with the pressure-spring and means for adjusting the same.

Similar letters of reference in the several figures indicate corresponding parts.

This invention has for its object to provide for public use a saw-mill dog of cheap and simple construction, and one that can be operated and adjusted in an easy and expeditious manner.

To these ends it consists, first, in the combination of an eccentric-lever and suitable connecting-strap with a vertically-moving shaft or bar carrying the dog head or stock, whereby the bit of the dog can be embedded into the log and there locked by a single movement of the eccentric-arm; secondly, in the combination of an adjustable dog head or stock with the carrying-shaft, for accommodating logs of different sizes; thirdly, in improved devices for effecting the adjustment of the head; fourthly, in the means for adjusting the dog laterally within the head or stock; and, lastly, in certain details of construction and combinations of parts, which I will now proceed to describe.

In the drawings, A represents the head-block proper, one of the standards B of which serves as a guide for the dog head or stock C; D, the carrying shaft or bar; g g, guides therefor; E, the eccentric, and F the strap which connects the eccentric with an arm, G, projecting from the upper end of the shaft D. The eccentric is pivoted at o to the guide-standard B, and is so arranged that when its arm E' is raised to a vertical position, as shown in Fig. 1, it will elevate the carrying-bar and head, and hold the bit of the dog out of contact with the log, while a downward movement of the arm will force the bit into the log until the eccentric reaches the limit of its throw and is "on its center," in which position the dog will be firmly locked, as shown in dotted lines, Fig. 1.

By the use of the eccentric there is no strain left on the log after it is dogged and locked, and the tendency for it to turn out from the under side on the head-block is entirely overcome.

As logs vary greatly in diameter, it is necessary, for the perfect working of the device, that the head or stock have some vertical adjustment on the carrying-shaft. There are many ways of accomplishing this result, one of which is shown in Fig. 2, in which p p are a pair of pawl-arms, pivoted within the head, in such manner that their inner ends or points engage with teeth formed on the carrying bar or shaft D. The outer ends or handles of the pawls are pressed apart by suitable springs S, interposed between them and an arm, I, projecting from the head; and the operator, by grasping these handles, can readily disengage the points of the pawls from the teeth of the carrying-shaft, and move the head up or down on the guide-standard B to any point on the carrying shaft desired.

For the purpose of giving the necessary lateral adjustment to the dog the head is mortised, as shown in Fig. 3, and the shank inserted. A steel tooth or projection, a, is dovetailed into the bottom of the mortise, at the outer end thereof, and is adapted to engage with a series of corresponding notches, b, in the under side of the shank; and the top of the mortise is tapered from the front to the rear, to give sufficient play to the outer end or handle of the shank to allow the notches to clear the tooth a in adjusting the dog back and forth. A spring, m, located in a recess in the head, exerts its pressure upon the upper side of the shank, and keeps one of the notches therein normally engaged with the tooth $a$. The tension of this spring may be regulated by adjusting the screw-block $a'$, against which it is seated.

By this arrangement of devices the dog can be moved in and out readily with one hand, and when a log rolls against the bit the notches will be thereby disengaged from the tooth in the mortise, and the dog will slide into position without the aid of the operator, thus avoiding delay and greatly facilitating the work.

I claim as my invention—

1. The combination of the eccentric-lever E E', pivoted to the standard B at $o$, with the connecting-strap F, articulated to the arm G of the reciprocatory shaft D, carrying the dog-head, the parts being so arranged that a downward movement of the lever will embed the dog into the log and lock it there, the lever assuming a perpendicular position against the standard out of the way, substantially as described.

2. The pawls $p\ p$, pivoted within the head C, as shown, one being adapted to engage with the toothed reciprocatory carrying-shaft D, to prevent an upward movement of the head, and the other to engage with said shaft to prevent a downward movement, when combined with the springs $s\ s$, interposed between their outer ends, substantially as described, for the purpose specified.

3. The laterally-sliding dog, provided with a series of notches, $b$, in combination with the mortised head, tooth $a$, and spring $m$, substantially as described, for the purpose specified.

4. The combination of the adjustable head C, adapted to slide on the guiding-standard B, with the carrying-shaft D, pawls $p\ p$, guides $g\ g$, eccentric-levers E E', and connecting-strap F, all arranged and operating in the manner and for the purpose specified.

GEORGE W. RODEBAUGH.

Witnesses:
    PETER O. VOORHEIS,
    LOOMIS A. MILLER.